(12) United States Patent
Pae et al.

(10) Patent No.: US 7,706,218 B2
(45) Date of Patent: Apr. 27, 2010

(54) OPTICAL PICKUP APPARATUS AND CONTROLLING METHOD THEREOF

(75) Inventors: Jung-gug Pae, Suwon-si (KR); Bong-gi Kim, Suwon-si (KR); Hyo-chan Lee, Suwon-si (KR); Soo-han Park, Yongin-si (KR); Seok-jung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 11/401,871

(22) Filed: Apr. 12, 2006

(65) Prior Publication Data

US 2006/0233073 A1 Oct. 19, 2006

(30) Foreign Application Priority Data

Apr. 13, 2005 (KR) .................... 10-2005-0030776

(51) Int. Cl.
*G11B 7/00* (2006.01)
(52) U.S. Cl. .................................................. 369/44.32
(58) Field of Classification Search ........................ None
See application file for complete search history.

(56) References Cited

U.S. PATENT DOCUMENTS

| 6,341,107 | B1 | 1/2002 | Watanabe |
| 6,493,177 | B1 * | 12/2002 | Ell et al. ................. 360/78.05 |
| 6,584,048 | B1 | 6/2003 | Tateishi et al. |
| 7,463,560 | B2 * | 12/2008 | Kanou ..................... 369/44.25 |

| 2003/0012106 | A1 | 1/2003 | Kobayashi |
| 2004/0022156 | A1 | 2/2004 | Choi |

FOREIGN PATENT DOCUMENTS

| JP | 4-137274 | 5/1992 |
| JP | 4-344334 | 11/1992 |
| JP | 10-188293 | 7/1998 |
| JP | 10-275340 | 10/1998 |
| JP | 11-149640 | 6/1999 |
| JP | 2003-157544 | 5/2003 |
| KR | 2003-85416 A | 4/2002 |

OTHER PUBLICATIONS

European Search Report issued in European Application No. 06112389.9 on Aug. 4, 2006.

* cited by examiner

*Primary Examiner*—Joseph H Feild
*Assistant Examiner*—Joseph Haley
(74) *Attorney, Agent, or Firm*—Stanzione & Kim, LLP

(57) ABSTRACT

An optical pickup apparatus includes an objective lens that focuses light on an optical recording medium; an actuator that drives the objective lens in a direction of an optical axis of the objective lens toward or away from an optical recording medium in response to an input voltage applied to the actuator; an actuator driven distance sensor that senses a distance the actuator moves according to time or the input voltage applied to the actuator; an input voltage calculator that calculates an input voltage to be applied to the actuator that compensates for a hysteresis phenomenon that occurs during movement of the actuator based on the distance sensed by the actuator driven distance sensor; and a controller that controls operation of the actuator according to the input voltage calculated by the input voltage calculator.

16 Claims, 6 Drawing Sheets

[Compensation]

[Hysteresis]

OPTICAL PICKUP APPARATUS AND CONTROLLING METHOD THEREOF

CROSS-REFERENCE TO RELATED APPLICATION

This application claims the benefit of Korean Patent Application No. 2005-30776 filed on Apr. 13, 2005 in the Korean Intellectual Property Office, the disclosure of which is incorporated herein by reference.

BACKGROUND OF THE INVENTION

1. Field of the Invention

An aspect of the invention relates to an optical pickup apparatus and a controlling method thereof, and more particularly to an optical pickup apparatus capable of accurately detecting a kind of optical recording medium by compensating for a hysteresis phenomenon that occurs during movement of an actuator, thereby making the actuator move linearly, and a controlling method thereof.

2. Description of the Related Art

CDs, DVDs, and more recently, BDs (Blu-ray Discs) are widely used as optical recording media. Since a distance between tracks and a minimum pit length on the CD, DVD, and BD media are different for each type of medium, a wavelength of a laser used in recording and reproducing data and a data recording are also different for each type of medium.

An infrared laser having a wavelength of 790 nm is used for recording and reproducing data on and from a CD. A data recording capacity of a CD is 650 MB.

A DVD is made from two discs having the same thickness glued together to form two sides. A recording layer is formed on either one surface or both surfaces of either one side or both sides to form a DVD having from one to four recording layers that can be designed to be read from either one side (single-sided) or both sides (double-sided). A red laser having a wavelength of 635-650 nm is used for recording and reproducing data on and from a DVD. A single-layer DVD has a data recording capacity of up to 4.7 GB.

A BD, unlike a DVD, is made from one disc and is designed to be read from one side. A blue laser having a wavelength of 405 nm is used for recording and reproducing data on and from a BD. A maximum data recording capacity of a single-sided, single-layer BD is 25-28 GB.

Also, a distance from a surface of the medium to a recording layer is different for each type of medium. For example, the distance from the surface of the medium to the recording layer is approximately 1.2 mm for the CD, 0.6 mm for the DVD, and 0.1 mm for the BD.

An optical pickup apparatus is used to record or reproduce data on or from CD, DVD, and BD media. As shown in FIG. 1, the optical pickup apparatus includes a laser diode 10, an HWP (half-wave plate) 15, a beam splitter 20, a reflecting mirror 25, a CL (collimating lens) 30, an OL (objective lens) 40, an HOE (holographic optical element) 35, a photodetector 50 such as a PDIC (photodiode integrated circuit), an actuator 60, and a controller 65.

The laser diode 10 includes a plurality of light sources to generate laser light having at least two different wavelengths for use in recording or reproducing data on or from at least different two media selected from a CD, a DVD, and a BD. The HWP 15 rotates the polarization direction of the laser light from the laser diode 10 to be perpendicular to the plane of the figure. The beam splitter 20 reflects the laser light toward the reflecting mirror 25 through the CL 30 which collimates the laser light. The reflecting mirror 25 reflects the laser light toward a medium 70 through the HOE 35. The HOE 35 circularly polarizes the laser light, and the circularly polarized laser light is focused by the OL 40 on the medium 70.

Light reflected from the medium 70 passes through the OL 40 and the HOE 35 toward the reflecting mirror 25, which reflects the light toward the beamsplitter 20 through the CL 30. The light then passes through the beam splitter 20 and is incident on the photodetector 50.

The actuator moves the OL 40 in a direction along an optical axis of OL 40 toward or away from the medium 70 to perform a focusing operation, and moves the OL 40 in a direction perpendicular to tracks of the medium 70 to perform a tracking operation.

Because different wavelengths of laser light are used to record and reproduce data on and from a CD, a DVD, and a BD, it is important that an optical pickup apparatus is capable of detecting the kind of optical recording medium mounted on the optical pickup apparatus and generating an a laser light appropriate for use with the detected kind of optical recording medium. To this end, when the optical recording medium 70 is mounted on the optical pickup apparatus, the controller 65 controls the actuator 60 to move toward or away from the optical recording medium 70 until two pulses are generated in an output signal of the photodetector 50 while the actuator 60 is moving in one direction, either toward or away from the optical recording medium 70. One pulse is generated when a focal point of the light focused by the OL 40 moves onto the surface of the optical recording medium 70 and the focused light is reflected from the surface, and the other pulse is generated when the focal point passes moves onto the recording layer of the optical recording medium 70 that is closest to the surface of the optical recording medium 70 and the focused light is reflected from the recording layer.

Referring to FIG. 2, the magnitude of an input voltage applied by the controller 65 to the actuator 60 to drive the actuator 60 to move toward or away from the optical recording medium 70 varies linearly with time. It is desirable that the actuator 60 move at a constant speed, and accordingly the input voltage and time satisfy a linear function.

Assuming that the actuator 60 moves at a constant speed, a time interval between the two pulses in the output signal of the photodetector 50 will depend on the distance between the surface of the optical recording medium 70 and the recording layer of the optical recording medium 70 that is closest to the surface of the optical recording medium 70, with a greater distance producing a greater time interval. Thus, in an ideal case, a time interval between the two pulses will be least for a BD for which the distance is 0.1 mm, will be greater for a DVD for which the distance is 0.6 mm, and will be greatest for a CD for which the distance is 1.2 mm.

FIG. 3A shows a DVD and the two positions of the OL 40 at which the two pulses are generated. A distance between these two positions is 0.6 mm and corresponds to a time interval t1 between the two pulses as shown in FIG. 3A.

FIG. 3B shows a CD and the two positions of the OL 40 at which the two pulses are generated. A distance between these two positions is 1.2 mm and corresponds to a time interval t2 between the two pulses as shown in FIG. 3B.

However, it turns out that, contrary to the ideal case discussed above, the time interval t2 between the pulse corresponding to the surface of the CD and the pulse corresponding to the recording layer of the CD is actually smaller than the time interval t1 between the pulse corresponding to the surface of the DVD and the pulse corresponding to the recording layer of the DVD. This result is shown in FIG. 4.

As discussed above, in the optical pickup apparatus shown in FIG. 1, an input voltage applied by the controller 65 to the actuator 60 to drive the actuator 60 varies linearly with time. However, a hysteresis phenomenon occurs as shown in FIG. 5, in which an actual driving voltage forms a hysteresis curve when plotted against distance to obtain a motion curve of the actuator 60. The shape of a portion of the hysteresis curve obtained when the actuator 60 moves toward the optical recording medium 70 is different from the shape of a portion of the hysteresis curve obtained when the actuator 60 moves away from the optical recording medium 70. Furthermore, the actuator 60 does not move at a constant speed in response to a linear input voltage. Rather, the actuator 60 moves slower when the actuator 60 is very close to or very far from the optical recording medium 70, and moves faster when the actuator 60 is at intermediate distances from the optical recording medium 70. Thus, the motion curve of the actuator shown in FIG. 5 is a non-linear motion curve.

Since the driving speed of the actuator 60 varies depending on the hysteresis phenomenon, the time interval between the pulse corresponding to the surface of the optical recording medium 70 and the pulse corresponding to the recording layer of the optical recording medium 70 may be different from an expected time interval. That is, as shown in FIG. 4, in a case where the time interval t1 between the pulse corresponding to the surface of a DVD and the pulse corresponding to the recording layer of the DVD is increased as much as t' from the ideal case (t1), and the time interval t2 between the pulse corresponding to the surface of a CD and the pulse corresponding to the recording layer of the CD reduced as much as t" from the ideal case (t2), the controller 65 may confuse the CD with the DVD. If the controller 65 confuses the CD with the DVD and the laser diode 10 generates laser light having a wavelength of 650 nm for use with a DVD when a CD is actually mounted on the optical pickup apparatus, an error occurs and the optical pickup apparatus stops working.

Therefore, it is necessary to prevent the speed of the actuator from changing due to the hysteresis phenomenon, so that the actuator can be driven linearly.

SUMMARY OF THE INVENTION

An aspect of the invention is to provide an optical pickup apparatus that is capable of driving an actuator so the actuator moves linearly, thereby making it possible to accurately detect a kind of optical recording medium, and a controlling method thereof.

In accordance with an aspect of the invention, an optical pickup apparatus includes an objective lens that focuses light on an optical recording medium; an actuator that drives the objective lens in a direction of an optical axis of the objective lens toward or away from the optical recording medium in response to an input voltage applied to the actuator; an actuator driven distance sensor that senses a distance the actuator moves according to time or the input voltage applied to the actuator; an input voltage calculator that calculates an input voltage to be applied to the actuator that compensates for a hysteresis phenomenon that occurs during movement of the actuator based on the distance sensed by the actuator driven distance sensor; and a controller that controls operation of the actuator according to the input voltage calculated by the input voltage calculator.

In accordance with an aspect of the invention, a motion curve representing a relation between the distance the actuator moves and the time or the input voltage applied to the actuator has a shape of a hysteresis curve.

In accordance with an aspect of the invention, the input voltage calculator calculates a function of the input voltage to be applied to the actuator by deriving a function that is symmetric with a function of the motion curve about a straight line representing a linear motion curve of the actuator.

In accordance with an aspect of the invention, a magnitude of the input voltage calculated by the input voltage calculator changes relatively rapidly when the actuator is relatively close to or relatively far away from the optical recording medium.

In accordance with an aspect of the invention, the magnitude of the input voltage changes relatively slowly when the actuator is at intermediate distances from the optical recording medium between a minimum distance from the optical recording medium and a maximum distance from the optical recording medium.

In accordance with an aspect of the invention, the controller controls the actuator to move at a constant speed according to the input voltage calculated by the input voltage calculator.

In accordance with another aspect of the invention, there is provided a method of controlling an optical pickup apparatus, the optical pickup apparatus including an objective lens that focuses light on an optical recording medium, and an actuator that drives the objective lens in a direction of an optical axis of the objective lens toward or away from the optical recording medium in response to an input voltage applied to the actuator, the method including sensing a distance the actuator moves according to time or the input voltage applied to the actuator; calculating an input voltage to be applied to the actuator that compensates for a hysteresis phenomenon that occurs during movement of the actuator based on the distance sensed by the actuator driven distance sensor; and controlling operation of the actuator according to the input voltage calculated by the input voltage calculator.

In accordance with another aspect of the invention, an optical pickup apparatus includes an objective lens that focuses light on an optical recording medium; an actuator that drives the objective lens toward or away from the optical recording medium at a speed determined by an input voltage applied to the actuator; and a controller that applies a non-linear input voltage to the actuator to cause the actuator to drive the objective lens toward or away from the optical recording medium at a constant speed.

In accordance with another aspect of the invention, there is provided a method of controlling an optical pickup apparatus, the optical pickup apparatus including an objective lens that focuses light on an optical recording medium, and an actuator that drives the objective lens toward or away from the optical recording medium at a speed determined by an input voltage applied to the actuator, the method including applying a non-linear input voltage to the actuator to cause the actuator to drive the objective lens toward or away from the optical recording medium at a constant speed.

Additional aspects and/or advantages of the invention will be set forth in part in the description that follows and, in part, will be obvious from the description, or may be learned by practice of the invention.

BRIEF DESCRIPTION OF THE DRAWINGS

These and/or other aspects and features of the invention will become apparent and more readily appreciated from the following description of embodiments of the invention, taken in conjunction with the accompanying drawings, of which.

DETAILED DESCRIPTION OF THE EMBODIMENTS

Figure 1:
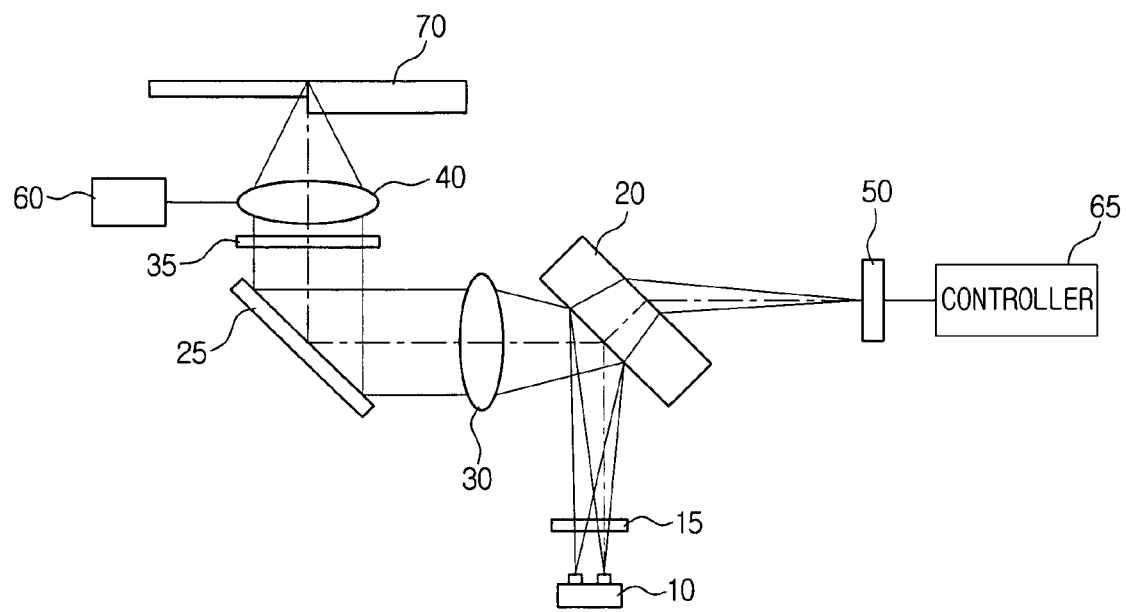
FIG. 1 is a diagram of an optical pickup apparatus of the related art.
Figure 2:
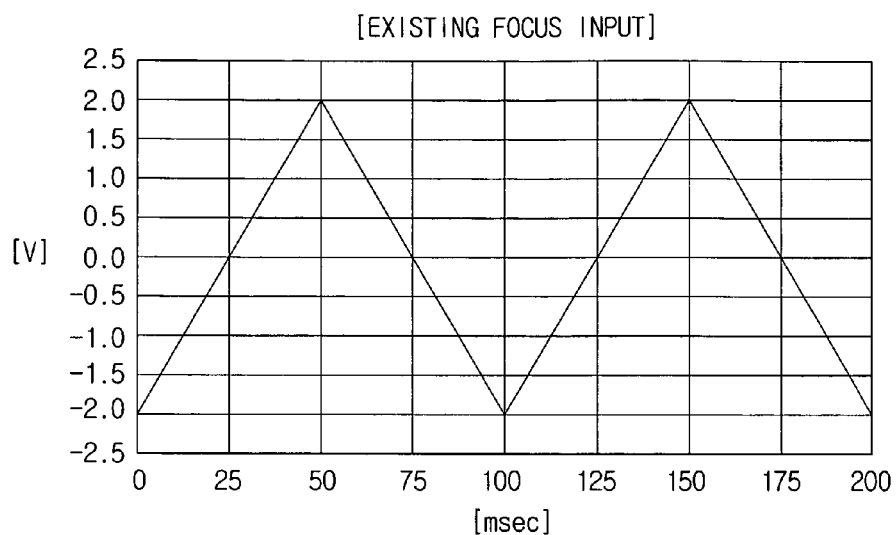
FIG. 2 is a graph showing a linear input voltage applied to an actuator.
Figure 3A:
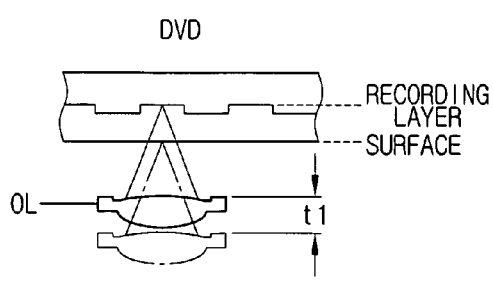
FIG. 3A is a sectional view showing states in which light is focused on a surface and a recording layer of a DVD in a process of identifying a kind of optical recording medium.
Figure 3B:
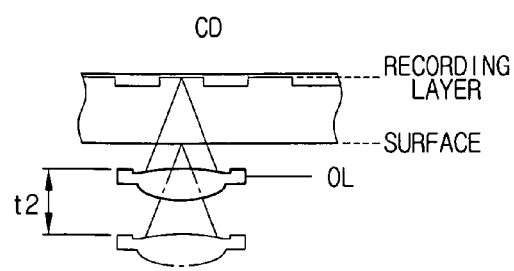
FIG. 3B is a sectional view showing states in which light is focused on a surface and a recording layer of a CD in a process of identifying a kind of optical recording medium.
Figure 4:
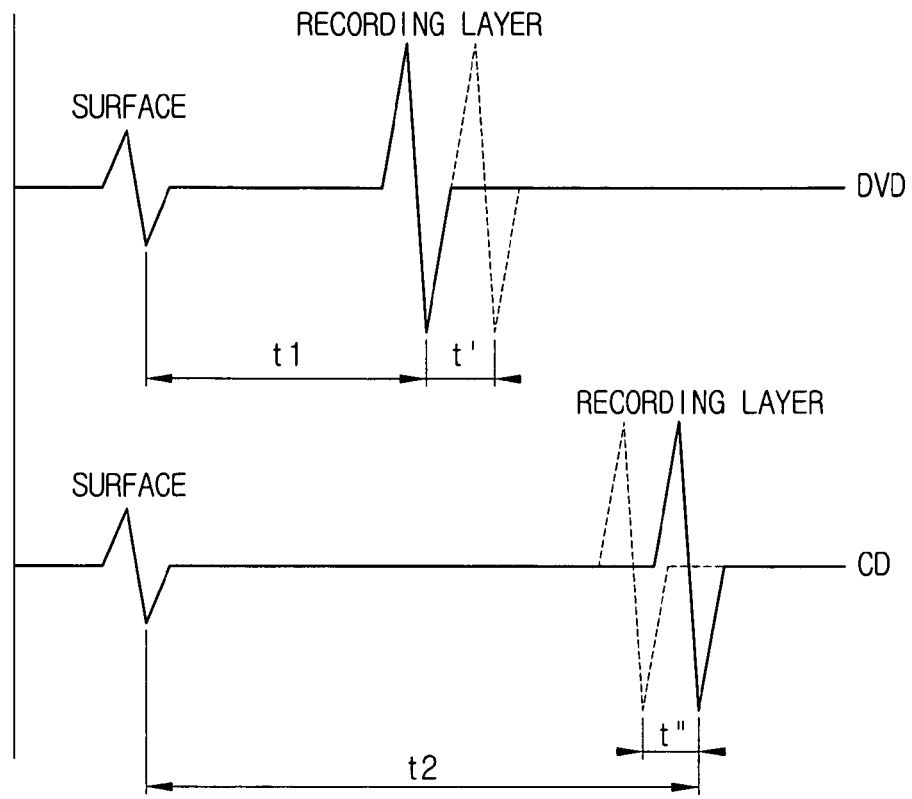
FIG. 4 shows pulses generated in an output signal of a photodetector by light reflected from the surface and the recording layer of a DVD and a CD in the states shown in FIGS. 3A and 3B, respectively, resulting in an incorrect identification of the DVD as the CD due to a hysteresis phenomenon occurring during movement of an actuator.

Reference will now be made in detail to embodiments of the invention, examples of which are shown in the accompanying drawings, wherein like reference numerals refer to like elements throughout. The embodiments are described below in order to explain the invention by referring to the figures.

To accurately identify a kind of optical recording medium, an optical pickup apparatus in accordance with an aspect of the invention compensates for a hysteresis phenomenon occurring during movement of an actuator so that the actuator can move linearly.

Figure 6:
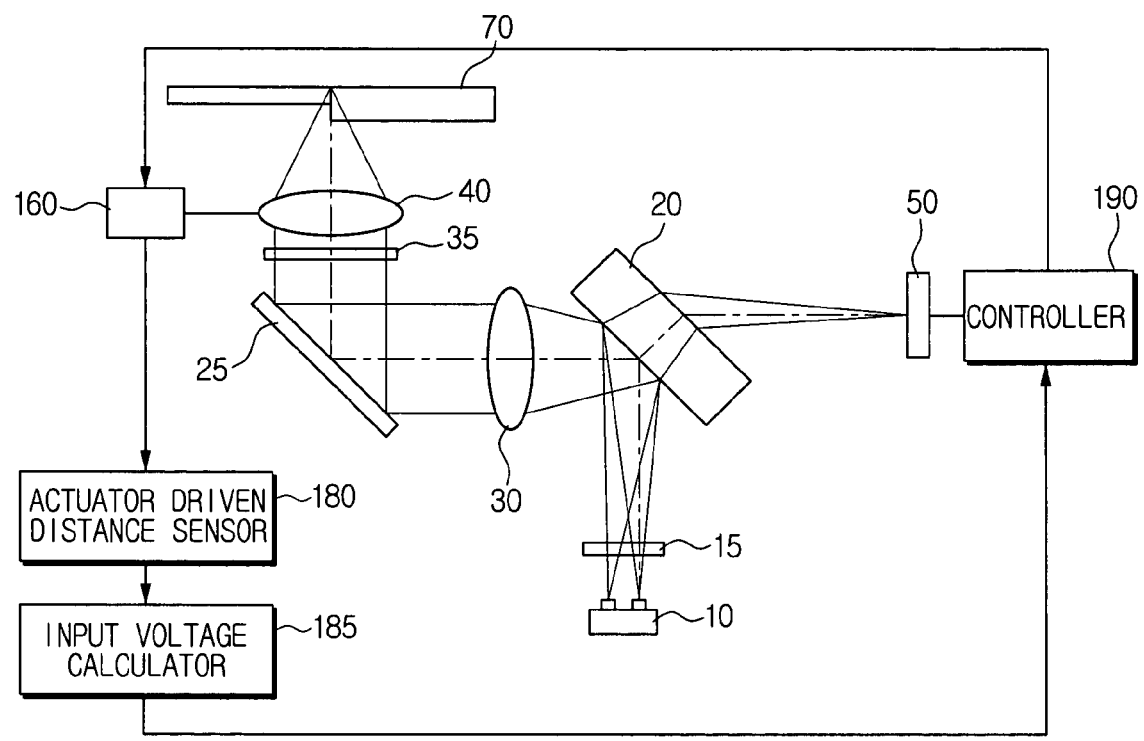
FIG. 6 is a diagram of an optical pickup apparatus in accordance with an aspect of the invention.

FIG. 6 is a diagram of the optical pickup apparatus according to an aspect of the invention. The optical pickup apparatus includes a laser diode 10, an HWP (half-wave plate) 15, a beam splitter 20, a reflecting mirror 25, a CL (collimating lens) 30, an OL (objective lens) 40, an HOE (holographic optical element) 35, a photodetector 50 such as an PDIC (photodiode integrated circuit), an actuator 160, an actuator driven distance sensor 180, an input voltage calculator 185, and a controller 190.

The operation of the laser diode 10, the HWP 15, the beam splitter 20, the reflecting mirror 25, the CL 30, the OL 40, the HOE 35, and the photodetector 50 was already described above in connection with FIG. 1, and thus will not be repeated here.

The actuator driven distance sensor 180 senses a driving speed of the actuator 160 as the actuator 160 moves toward or away from an optical recording medium mounted on the optical pickup apparatus. Generally, an input voltage applied to the actuator 160 to drive the actuator 160 is set or designed to increase linearly to make the actuator 160 move at a constant speed. In practice, however, the actuator 160 moves non-linearly due to the hysteresis phenomenon in response to a linear input voltage. As a result, the actuator 160 moves at a non-constant speed in response to a linear input voltage.

Figure 5:
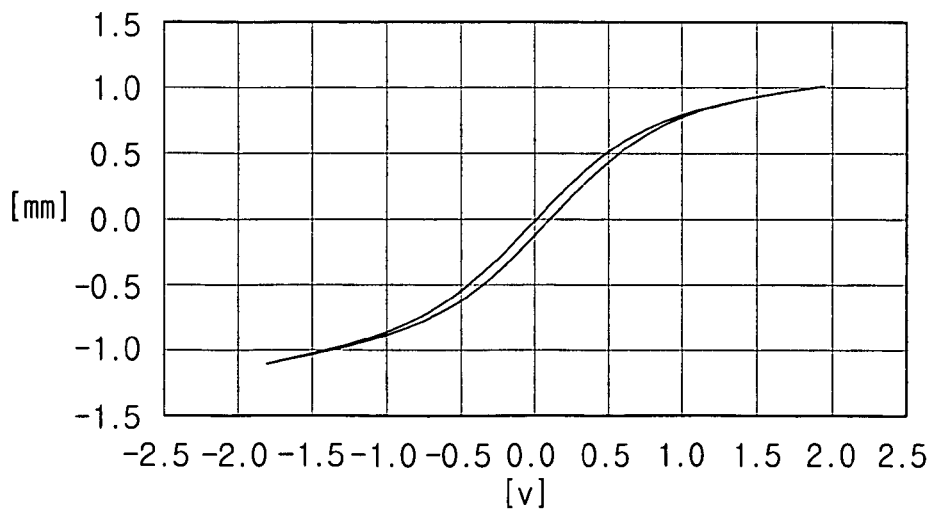
FIG. 5 is a graph of a non-linear motion curve of an actuator exhibiting a hysteresis phenomenon.

The actuator driven distance sensor 180 measures an actual driven distance of the actuator 160 with respect to an input voltage or time. The distance the actuator 160 moves as measured by the actuator driven sensor 180 will form a hysteresis curve with respect to an input voltage applied to the actuator 160 as shown in FIG. 5.

The input voltage calculator 185 obtains a function of the distance the actuator 160 moves and the input voltage by using the results of the measurement performed by the actuator driven distance sensor 180. A distance y the actuator 160 moves can be expressed in terms of an input voltage x as follows:

$$y=-0.0016x^6+0.099x^5-0.0028x^4-0.4254x^3+0.002x^2+1.1536x-0.0035 \quad [\text{Equation 1}]$$

As can be seen from Equation 1, the distance y the actuator 160 moves is sixth-degree polynomial function of the input voltage x. The distance y varies depending on a modulus of elasticity of a supporting wire or structure of the actuator 160.

Figure 7:
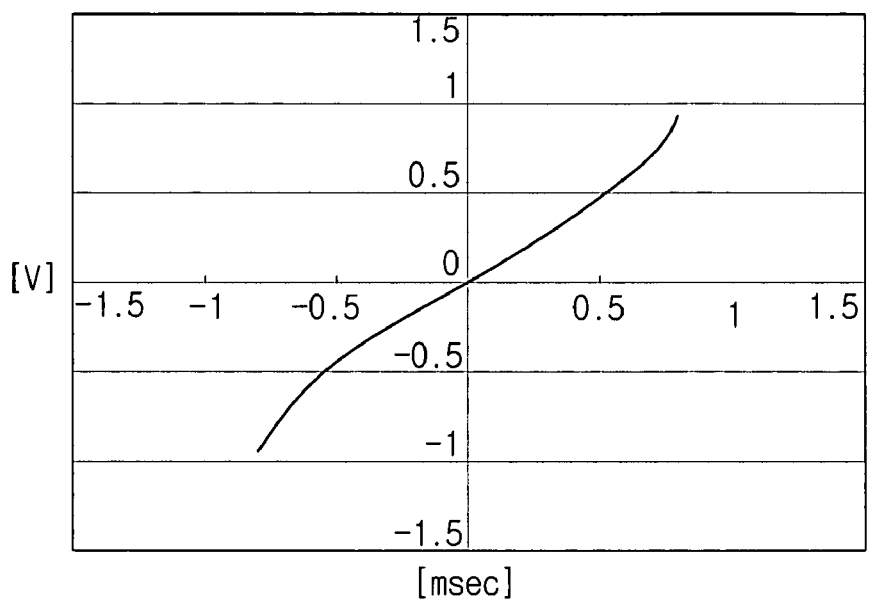
FIG. 7 is a graph of a compensation curve which is calculated by an input voltage calculator shown in FIG. 6.

The input voltage calculator 185 calculates an input voltage required for the actuator 160 to move linearly using the function of Equation 1. In order to compensate for a non-linear motion curve of the actuator 160 similar to the hysteresis curve shown in FIG. 5, it is first necessary to form a compensation curve which is symmetric with the actual motion curve of the actuator 160 about a straight line representing a linear motion curve of the actuator 160 if the actuator 160 were to move ideally. This results in a compensation curve as shown in FIG. 7 which compensates for the non-linear motion curve of the actuator 160 similar to the hysteresis curve shown in FIG. 5. This compensation curve can be calculated by reflecting the function of Equation 1 about the straight line representing a linear motion curve of the actuator 160, or, in other words, deriving a function that is symmetric with the function of Equation 1 about the straight line representing a linear motion curve of the actuator 160. The function of such a compensation curve calculated based the function of Equation 1 is as follows:

$$x=0.0521y^6+0.6624y^5-0.0212y^4-0.001y^3+0.0038y^2+0.8926y-0.003 \quad [\text{Equation 2}]$$

Figure 8:
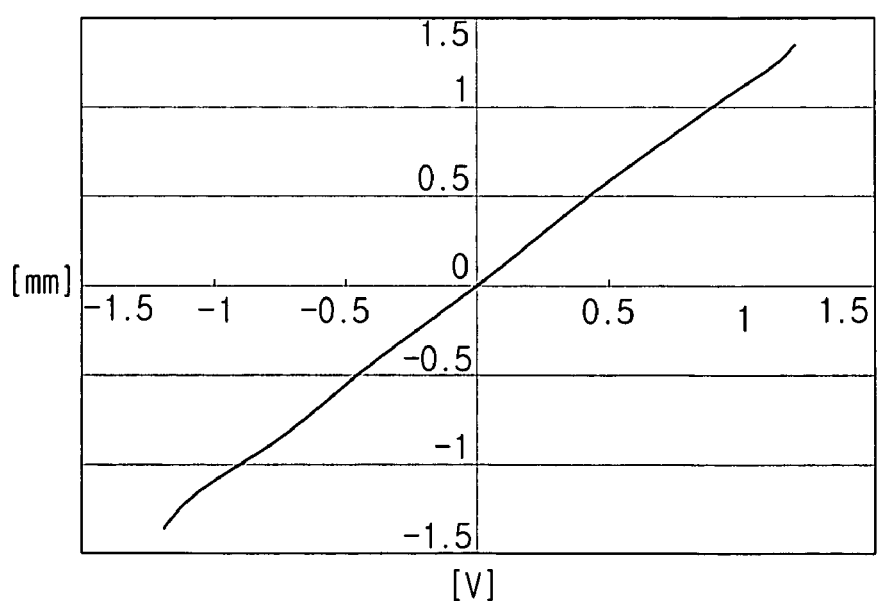
FIG. 8 is a graph of a linear motion curve of an actuator driven by an input voltage calculated in accordance with the compensation curve shown in FIG. 7.

Equation 2 is a function of an input voltage (x) to be applied to the actuator 160, and the input voltage (x) is a sixth-degree polynomial function of the distance y the actuator 160 moves. When an input voltage obtained from Equation 2 is applied to the actuator 160, the actual motion curve of the actuator 160 is compensated to produce a linear motion curve as shown in FIG. 8. Consequently, the actuator 160 moves at a constant speed, i.e., linearly.

Figure 9:
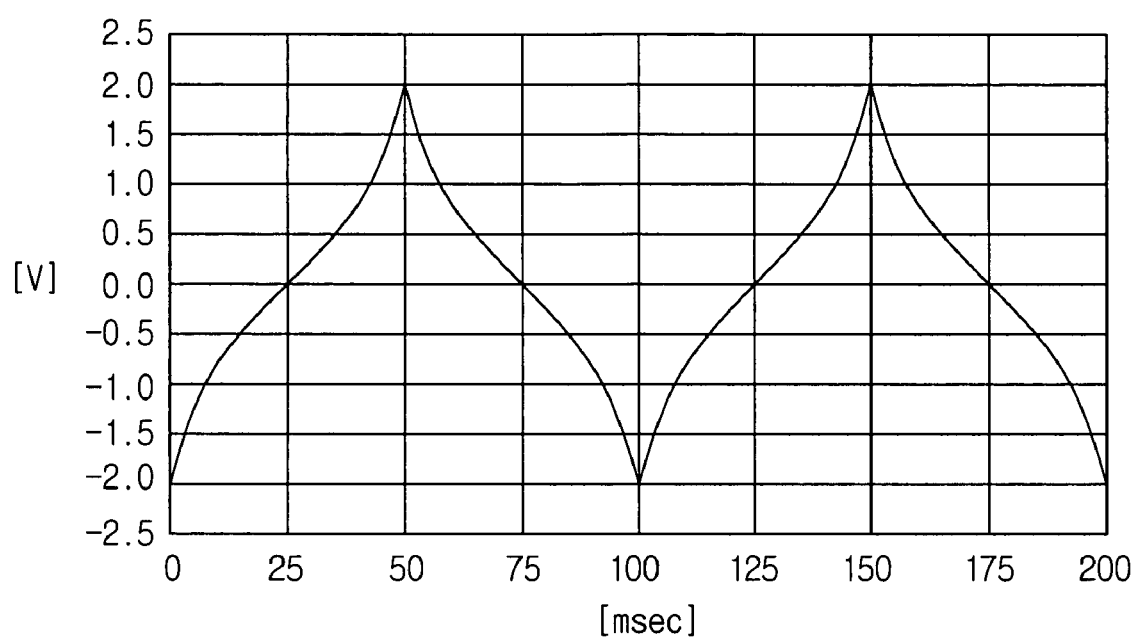
FIG. 9 is a graph showing of a non-linear input voltage applied to an actuator which is calculated by the input voltage calculator shown in FIG. 6 in accordance with the compensation curve shown in FIG. 7.

FIG. 9 is a graph obtained from Equation 2, in which input voltages to be applied to the actuator 160 are plotted with respect to time. As can be seen from the graph, the magnitude of the input voltage changes relatively rapidly to increase the driving speed of the actuator 160 when the actuator 160 is close to or far away from the optical recording medium 70, and changes relatively slowly to reduce the driving speed of the actuator 160 when the actuator 160 is at intermediate distances from the optical recording medium 70 between a minimum distance from the optical recording medium 70 and a maximum distance between the optical recording medium 70. In this manner, the hysteresis phenomenon occurring during movement of the actuator 160 can be compensated for, and the actuator 160 can be driven so that it moves linearly as shown in FIG. 8.

How the optical pickup apparatus determines an input voltage to be applied to the actuator 160 will now be described.

When an optical recording medium 70 is mounted on the optical pickup apparatus, the controller 190 applies a linear input voltage to the actuator 160.

The actuator driven distance sensor 180 measures an actual distance the actuator 160 moves according to time or the change in the input voltage. The measured distances the actuator 160 moves form a non-linear motion curve similar to the hysteresis curve shown in FIG. 5 and that is expressed by Equation 1. The input voltage calculator 185 generates a compensation curve as shown in FIG. 7 to compensate for the non-linear motion curve. The compensation curve is obtained by reflecting the non-linear motion curve about a straight line representing a linear motion curve of the actuator 160, or, in other words, deriving a function that is symmetric with the function of Equation 1 about the straight line representing a linear motion curve of the actuator 160, with the derived function being expressed by Equation 2. The function of the compensation curve is expressed in Equation 2 as a function of an input voltage applied to the actuator 160. Therefore, the controller 190 drives the actuator 160 by adjusting an input voltage applied to the actuator 160 according to Equation 2. In other words, the controller 190 applies a non-linear input voltage as shown in FIG. 9 to the actuator 160, and the actuator 160 then moves linearly in response to this non-linear input voltage. In short, the actuator 160 moves at a constant speed as shown in FIG. 8.

Therefore, since the actuator 160 moves at a constant speed, an optical pickup apparatus in accordance with an aspect of the invention is able to accurately measure a time interval between a pulse generated when light is reflected from the surface of the optical recording medium 70 and a pulse generated when light is reflected from the recording layer of the optical recording medium 70. Since the time interval between the two pulses varies according to a kind of the optical recording medium, identification of the kind of the optical recording medium based on the time interval can be performed accurately because the optical pickup apparatus in accordance with an aspect of the invention is able to accurately measure the time interval. Therefore, it is now possible to prevent the problem wherein the optical pickup apparatus of the related art sometimes misidentifies the kind of the optical recording medium and generates laser light having an incorrect wavelength, causing an operation of recording or reproducing data on or from the optical recording medium to fail.

As explained above, according to an aspect of the invention, the kind of the optical recording medium mounted on the optical pickup apparatus can be detected more accurately by compensating for the hysteresis phenomenon that occurs during the movement of the actuator, thereby making the actuator move linearly.

Although a few embodiments of the invention have been shown and described, it would be appreciated by those skilled in the art that changes may be made in these embodiments without departing from the principles and spirit of the invention, the scope of which is defined in the claims and their equivalents.

What is claimed is:

1. An optical pickup apparatus comprising:
   an objective lens that focuses light on an optical recording medium;
   an actuator that drives the objective lens in a direction of an optical axis of the objective lens toward or away from the optical recording medium in response to an input voltage applied to the actuator;
   an actuator driven distance sensor that senses a distance the actuator moves according to time or the input voltage applied to the actuator;
   an input voltage calculator that calculates an input voltage to be applied to the actuator that compensates for a hysteresis phenomenon that occurs during movement of the actuator based on the distance sensed by the actuator driven distance sensor; and
   a controller that controls the actuator to move at a constant speed according to the input voltage calculated by the input voltage calculator;
   wherein the input voltage calculator calculates a function of the input voltage to be applied to the actuator by deriving a function that is symmetric with a function of the motion curve about a straight line representing a linear motion curve of the actuator,
   wherein the motion curve represents a relation between the distance the actuator moves and the time or the input voltage applied to the actuator.

2. The apparatus of claim 1, wherein the motion curve has a shape of a hysteresis curve.

3. The apparatus of claim 1, wherein a magnitude of the input voltage calculated by the input voltage calculator changes relatively rapidly when the actuator is relatively close to or relatively far away from the optical recording medium.

4. The apparatus of claim 3, wherein the magnitude of the input voltage changes relatively slowly when the actuator is at intermediate distances from the optical recording medium between a minimum distance from the optical recording medium and a maximum distance from the optical recording medium.

5. A method of controlling an optical pickup apparatus, the optical pickup apparatus comprising an objective lens that focuses light on an optical recording medium, an actuator that drives the objective lens in a direction of an optical axis of the objective lens toward or away from the optical recording medium in response to an input voltage applied to the actuator, and an actuator driven distance sensor, the method comprising:
   sensing a distance the actuator moves according to time or the input voltage applied to the actuator with the actuator driven distance sensor;
   calculating an input voltage to be applied to the actuator that compensates for a hysteresis phenomenon that occurs during movement of the actuator based on the distance sensed by the actuator driven distance sensor; and
   controlling operation actuator to move at a constant speed according to the input voltage calculated by the input voltage calculator,
   wherein the calculating of the input voltage comprises calculating a function of the input voltage to be applied to the actuator by deriving a function that is symmetric with a function of a motion curve about a straight line representing a linear motion curve of the actuator,
   wherein the motion curve representing a relation between the distance the actuator moves and the time or the input voltage applied to the actuator.

6. The method of claim 5, wherein a motion curve has a shape of a hysteresis curve.

7. The method of claim 5, wherein a magnitude of the input voltage calculated by the input voltage calculator changes relatively rapidly when the actuator is relatively close to or relatively far away from the optical recording medium.

8. The method of claim 7, wherein the magnitude of the input voltage changes relatively slowly when the actuator is at intermediate distances from the optical recording medium between a minimum distance from the optical recording medium and a maximum distance from the optical recording medium.

9. An optical pickup apparatus comprising:
an objective lens that focuses light on an optical recording medium;
an actuator that drives the objective lens toward or away from the optical recording medium at a speed determined by an input voltage applied to the actuator; and
a controller that applies a non-linear input voltage to the actuator to cause the actuator to drive the objective lens toward or away from the optical recording medium at a constant speed,
an actuator driven distance sensor that senses a distance the actuator moves according to time or the input voltage applied to the actuator; and
an input voltage calculator that calculates a motion curve of the actuator based on the distance sensed by the actuator driven distance sensor, calculates a compensation curve to compensate for a non-linearity in the motion curve of the actuator, and calculates a non-linear input voltage to be applied to the actuator based on the compensation curve;
wherein the controller applies the non-linear input voltage calculated by the input voltage calculator to the actuator.

10. The apparatus of claim 9, wherein the controller initially applies a linear input voltage to the actuator when the optical recording medium is mounted on the optical pickup apparatus;
wherein the input voltage calculator calculates the motion curve of the actuator based on the distance sensed by the actuator driven distance sensor while the linear input voltage is being applied to the actuator; and
wherein the controller subsequently applies the non-linear input voltage calculated by the input voltage calculator to the actuator.

11. The apparatus of claim 9, wherein the input voltage calculator calculates the compensation curve by deriving a function defining the compensation curve that is symmetric with a function defining the motion curve of the actuator about a straight line representing a linear motion curve of the actuator.

12. The apparatus of claim 9, wherein the motion curve of the actuator is defined by the following equation:

$$y = -0.0016x^6 + 0.099x^5 - 0.0028x^4 - 0.4254x^3 + 0.002x^2 + 1.1536x - 0.0035$$

where y is a distance the actuator moves and x is an input voltage applied to the actuator; and
wherein the compensation curve is defined by the following function:

$$x = 0.0521y^6 + 0.6624y^5 - 0.0212y^4 - 0.001y^3 + 0.0038y^2 + 0.8926y - 0.003$$

where x is an input voltage applied to the actuator and y is a distance the actuator moves.

13. A method of controlling an optical pickup apparatus, the optical pickup apparatus comprising an objective lens that focuses light on an optical recording medium, and an actuator that drives the objective lens toward or away from the optical recording medium at a speed determined by an input voltage applied to the actuator, the method comprising:
applying a non-linear input voltage to the actuator to cause the actuator to drive the objective lens toward or away from the optical recording medium at a constant speed,
sensing a distance the actuator moves according to time or the input voltage applied to the actuator;
calculating a motion curve of the actuator based on the distance sensed in the sensing of the distance;
calculating a compensation curve to compensate for a non-linearity in the motion curve of the actuator; and
calculating a non-linear input voltage to be applied to the actuator based on the compensation curve;
wherein the applying of the non-linear input voltage to the actuator comprises applying the non-linear input voltage calculated in the calculating of the non-linear input voltage to the actuator,
wherein the calculating of the compensation curve comprises calculating the compensation curve by deriving a function defining the compensation curve that is symmetric with a function defining the motion curve of the actuator about a straight line representing a linear motion curve of the actuator.

14. The method of claim 13, further comprising:
initially applying a linear input voltage to the actuator when the optical recording medium is mounted on the apparatus;
wherein the sensing of the distance comprises sensing the distance the actuator moves according to time or the input voltage applied to the actuator while the linear input voltage is being applied to the actuator;
wherein the calculating of the motion curve of the actuator comprises calculating the motion curve of the actuator based on the distance sensed in the sensing of the distance while the linear input voltage is being applied to the actuator; and
wherein the applying of the non-linear voltage to the actuator comprises subsequently applying the non-linear input voltage calculated in the calculating of the non-linear input voltage to the actuator.

15. The method of claim 13, wherein the calculating of the compensation curve comprises calculating the compensation curve by deriving a function defining the compensation curve that is symmetric with a function defining the motion curve of the actuator about a straight line representing a linear motion curve of the actuator.

16. The method of claim 13,
wherein the motion curve of the actuator is defined by the following equation:

$$y = -0.0016x^6 + 0.099x^5 - 0.0028x^4 - 0.4254x^3 + 0.002x^2 + 1.1536x - 0.0035$$

where y is a distance the actuator moves and x is an input voltage applied to the actuator; and
wherein the compensation curve is defined by the following function:

$$x = 0.0521y^6 + 0.6624y^5 - 0.0212y^4 - 0.001y^3 - 0.0038y^2 + 0.8926y - 0.003$$

where x is an input voltage applied to the actuator and y is a distance the actuator moves.

* * * * *